United States Patent
Tsuji et al.

[11] Patent Number: 5,906,311
[45] Date of Patent: *May 25, 1999

[54] SECONDARY COIL PLATE FOR LINEAR MOTOR AND PRODUCING METHOD OF THE SAME

[75] Inventors: Susumu Tsuji; Hideyuki Kidokoro; Takashi Inaba; Yasuo Ido; Masaaki Sakamoto, all of Nagoya, Japan

[73] Assignee: Daido Metal Company Ltd., Nagoya, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/886,036

[22] Filed: Jun. 30, 1997

[30] Foreign Application Priority Data

Jul. 4, 1996 [JP] Japan .................................... 8-195595

[51] Int. Cl.⁶ .................................................. B23K 20/04
[52] U.S. Cl. ................ 228/235.2; 228/205; 228/262.44; 228/231; 148/531
[58] Field of Search .................................. 310/12–14, 42; 228/235.2, 235.3, 205, 190, 262.44, 265; 148/527, 531, 535

[56] References Cited

U.S. PATENT DOCUMENTS

| 3,952,938 | 4/1976 | Ulam ........................................ 228/190 |
| 4,290,828 | 9/1981 | Aisaka et al. ........................... 148/529 |
| 4,831,708 | 5/1989 | Yoshiwara et al. ..................... 228/158 |
| 5,447,698 | 9/1995 | Jha et al. ................................. 422/180 |

*Primary Examiner*—Samuel M. Heinrich
*Attorney, Agent, or Firm*—Browdy and Neimark

[57] ABSTRACT

A surface metal plate 2 made of aluminium or aluminium alloy is overlayed upon a backing metal plate 1 and integrally bonded by cold rolling bonding of a rolling machine 30. After that, the thus obtained composite metal plate 3 is annealed, so that the bonding strength between a surface metal layer 1a having a thickness of 2 to 8 mm and a backing metal layer 2a is enhanced.

1 Claim, 1 Drawing Sheet

SECONDARY COIL PLATE FOR LINEAR MOTOR AND PRODUCING METHOD OF THE SAME

FIELD OF THE INVENTION

The present invention relates to a secondary coil plate for linear motor and a method of producing the same.

BACKGROUND OF THE INVENTION

A linear motor is a motor which effects linear movement instead of rotational movement by linearly extending a structure of a rotary-type motor. In the case of the linear motor car, a magnetic field is induced by supplying alternating current to a primary coil mounted on a car side, and a force is generated due to an interaction between this magnetic field and a magnetic field induced on a secondary coil (reaction plate) mounted on a track side. This force is utilized as a motive force. A driving force for the motor car is thus obtained.

The reaction plate used as a secondary coil plate is required to have a property of low electric resistance. In view of the cost and the strength, a composite metal plate, which is obtained by overlaying a surface metal plate made of copper or aluminium upon a backing metal plate made of steel, is used.

Since the surface metal layer of the composite metal plate in which a high current flows through has a sufficient thickness of 2 to 8 mm, a mechanical bonding method such as calking, hot rolling bonding (hot bonding) and explosive bonding are conventionally used as a method for fixing the surface metal plate to the backing metal plate.

However, the mechanical bonding method such as calking requires an apparatus having a complicated structure thereby raising the manufacturing cost. Also, hot bonding or explosive bonding requires a large scale of manufacturing system thereby raising the manufacturing cost.

In this way, the cost of the secondary coil plate for linear motor car manufactured by conventional technique inevitably becomes high.

SUMMARY OF THE INVENTION

The present invention has been achieved in taking the above-described technical background into account.

An objective of the present invention is to provide a secondary coil plate for linear motor, which is manufacturable regardless of any thickness of the surface metal plate by cold rolling bonding (cold bonding) and capable of reducing the manufacturing costs.

According to the present invention to achieve the objective, there are provided a secondary coil plate for linear motor and a method of producing the same as follows:

1) A secondary coil plate for linear motor, which is a composite metal plate comprising a backing metal layer and a surface metal layer which are produced by integrally bonding a backing metal plate and a surface metal plate, the surface metal layer being formed of aluminium or aluminium alloy and having a thickness of 2 to 8 mm, the surface metal plate is integrally bonded with the backing metal plate by cold rolling bonding.

2) A method of producing a secondary coil plate for linear motor, which is a composite metal plate comprising a backing metal layer and a surface metal layer which are produced by integrally bonding a backing metal plate and a surface metal plate, comprising the steps of:

a) preparing the backing metal plate and the surface metal plate,
b) grinding one surface of the surface metal plate by a wire brush of which the wire diameter is 0.15 to 0.40 mm and grinding one surface of the backing metal plate by a belt sander of 24 to 40 #,
c) overlaying the ground one surface of the surface metal plate upon the ground one surface of the backing metal plate,
d) bonding the backing metal plate and the surface metal plate integrally by a rolling machine under reduction ratio in thickness of the backing metal plate of 10 to 40% at room temperature thereby obtaining a composite metal plate which has a total thickness of 10 to 40 mm and includes the surface metal layer having a thickness of 2 to 8 mm,
e) annealing the composite metal plate at a temperature of 300 to 380° C. for 4 to 8 hours.

In above production method, the wire diameter of a wire brush is set up from 0.15 to 0.40 mm because bonding defects occur outside this range, the abrasive grain of a belt sander is set up from 24 to 40 # because bonding defects occur outside this range, the reduction ratio in thickness of the backing metal plate is set up from 10 to 40% because bonding defects occur at less than 10% and a large rolling machine is needed for over 40%, the annealing temperature is set up from 300 to 380° C. because bonding defects occur due to the shortage of diffusion at less than 300° C. and due to the generation of intermetallic compound over 380° C., the annealing time is set up from 4 to 8 hours because bonding defects occur due to the shortage of diffusion less than 4 hrs and due to the generation of intermetallic compound over 8 hrs.

DETAILED DESCRIPTION OF THE PREFERRED EMBODIMENT

Figure 1:
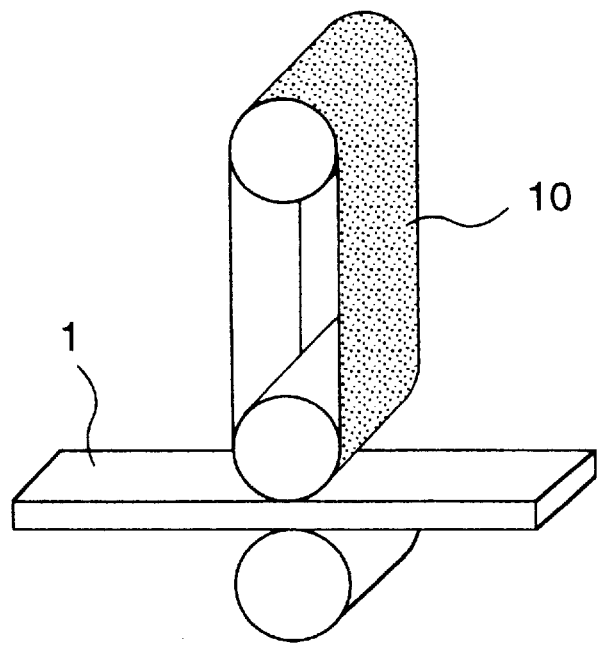
FIG. 1 is a schematic illustration showing grinding process of a backing metal layer.
Figure 2:
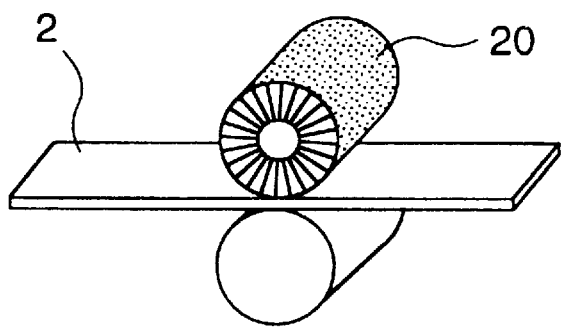
FIG. 2 is a schematic illustration showing grinding process of a surface metal layer.

The present invention will be hereinafter described with reference to the accompanying drawings of FIGS. 1–3.

Surfaces of a steel plate (JIS SS400) having a thickness of 19 mm, a width of 380 mm and a length of 4,700 mm as a backing metal plate 1 were degreased. After that, one surface of the backing metal plate was ground from the surface up to 0.3 mm by a belt sander of 36 # as shown in FIG. 1, thereby a newly activated fresh surface, from which oxides were removed, was exposed on the one surface of the backing metal plate 1.

Surfaces of an aluminium plate (JIS A1050P-0) having a thickness of 7.5 mm, a width of 380 mm and a length of 3,800 mm as a surface metal plate 2 were degreased. After that, one surface of the surface metal plate was ground by a wire brush of which the wire diameter is 0.3 mm as shown in FIG. 2, thereby a newly activated fresh surface, from which oxides were removed, was exposed on the one surface of the surface metal plate 2.

Figure 3:
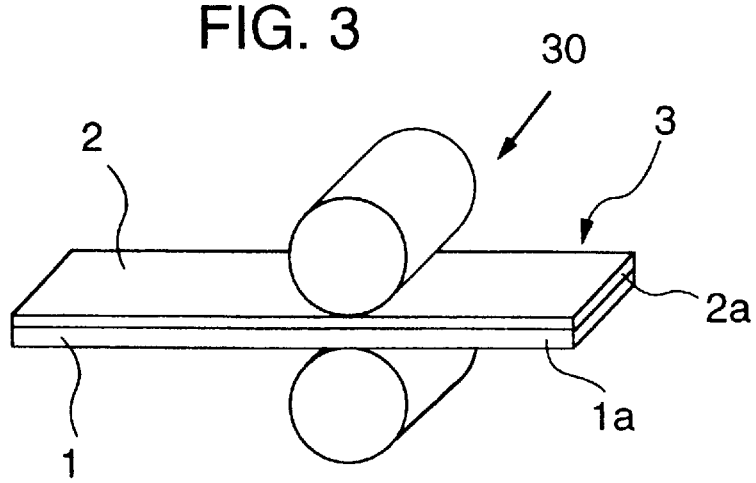
FIG. 3 is a schematic illustration showing rolling process.

The ground surface of the surface metal plate 2 was overlaid upon the ground surface of the backing metal plate 1, and thus the metal plates 1, 2 were subjected to cold rolling by a rolling machine 30 at room temperature under reduction ratio in thickness of the backing metal plate of 15% as shown in FIG. 3, thereby obtaining a composite metal plate 3 which has a total thickness of 21 mm and consists of a surface metal layer 2a and a backing metal layer 1a.

Then, the composite metal plate 3 was subjected to a diffusion annealing at a temperature of 350° C. for about five hours, and thus the bonding strength between the backing metal layer 1a and the surface metal layer 2a was enhanced. After that, the composite metal plate 3 was cut to have the same width and length as a product size of a secondary coil plate for a linear motor.

With regard to the thus obtained coil plate for linear motor, the shear testing based upon JIS G0601 was carried out. As a result of that, it was proved that the composite metal plate 3 had a shear strength of 8 kg/mm$^2$ and thus had a sufficient bonding strength. Also, ultrasonic testing was carried out throughout the whole area of the composite metal plate 3. As a result of that, it was proved that there were not un-bonded portions and thus the backing metal plate 1 and the surface metal plate 2 were well bonded together.

In this embodiment, since the secondary coil plate for linear motor is obtained by cold bonding the backing metal plate 1 and the surface metal plate 2 after degreasing and grinding each of the metal plates 1, 2 and then diffusion annealing the composite metal plate 3, the cheap secondary coil plate for linear motor can be manufactured without the necessity of an expensive conventional system such as a hot bonding system or explosive bonding system.

Further, in this embodiment, the backing metal plate 1 was ground by a belt sander 10 and the surface metal plate 2 was ground by a wire brush 20, however, the grinding means is not limited to a belt sander or a wire brush and other means such as a grinder and the like may be appropriately adapted.

The present invention has the following technical advantages:

(1) Since a surface metal plate made of aluminium or aluminium alloy is integrally bonded with a backing metal plate by cold bonding, it is possible to provide a cheap secondary coil plate for linear motor.

(2) It is possible to provide a method for manufacturing the secondary coil plate for linear motor under most suitable conditions.

What is claimed is:

1. A method of producing a secondary coil plate for linear motor, which is a composite metal plate comprising a backing metal layer and a surface metal layer which are produced by integrally bonding a backing metal plate and a surface metal plate, comprising the steps of:

a) preparing the backing metal plate and the surface metal plate b) grinding one surface of the surface metal plate by a wire brush of which the wire diameter is 0.15 to 0.40 mm and grinding one surface of the backing metal plate by a belt sander of 24 to 40 #, c) overlaying the ground surface of the surface metal plate upon the ground surface of the backing metal plate, d) bonding the backing metal plate and the surface metal plate integrally by a rolling machine under reduction ratio in thickness of the backing metal plate of 10 to 40% at room temperature thereby obtaining a composite metal plate which has a total thickness of 10 to 40 mm and includes the surface metal layer having a thickness of 2 to 8 mm, e) annealing the composite metal plate at a temperature of 300 to 380° C. for 4 to 8 hours.

* * * * *